United States Patent [19]

Wiemann et al.

[11] 4,372,899
[45] Feb. 8, 1983

[54] METHOD OF MANUFACTURING PARTICLEBOARD AND THE LIKE

[75] Inventors: Dieter Wiemann, Barsinghausen; Günter Seeger; Berndt Greten, both of Springe, all of Fed. Rep. of Germany

[73] Assignee: Bison-Werke Bahre & Greten GmbH & Co. KG, Fed. Rep. of Germany

[21] Appl. No.: 247,478

[22] Filed: Mar. 25, 1981

[30] Foreign Application Priority Data

Apr. 1, 1980 [DE] Fed. Rep. of Germany ....... 3012676
Apr. 1, 1980 [DE] Fed. Rep. of Germany ....... 3012677
Apr. 1, 1980 [DE] Fed. Rep. of Germany ....... 3012678
Apr. 1, 1980 [DE] Fed. Rep. of Germany ....... 3012679

[51] Int. Cl.³ .............................................. B29J 5/00
[52] U.S. Cl. ..................... 264/25; 264/109; 264/120; 425/80.1; 425/110; 425/174; 425/353; 425/371; 425/411
[58] Field of Search ...................... 156/62.2, 566, 362, 156/366, 344, 584, 64, 358, 360, 580, 583.91; 264/109, 120, 25; 425/80.1, 110, 353, 371, 289, 296, 297, 174, 406, 411, 436 R, 436 RM, 440; 100/258 RA

[56] References Cited

U.S. PATENT DOCUMENTS

| | | | |
|---|---|---|---|
| 2,907,071 | 10/1959 | Meiler et al. | 264/109 |
| 3,312,999 | 4/1967 | Greten et al. | 425/80.1 |
| 3,332,819 | 7/1967 | Siempelkamp | 425/80.1 |
| 3,814,787 | 6/1974 | Carlsson | 425/80.1 |
| 4,216,179 | 8/1980 | Lamberts et al. | 425/174 |

FOREIGN PATENT DOCUMENTS

1024096 2/1958 Fed. Rep. of Germany .
1653319 9/1971 Fed. Rep. of Germany .
2334450 1/1975 Fed. Rep. of Germany .
2363795 12/1977 Fed. Rep. of Germany .
2920219 11/1980 Fed. Rep. of Germany .
2920221 11/1980 Fed. Rep. of Germany .

Primary Examiner—Michael W. Ball
Attorney, Agent, or Firm—Townsend and Townsend

[57] ABSTRACT

Particleboard is manufactured by scattering an endless mat of chip and binder material on a series of overlapped mat carriers 17 moving on a forming conveyor 2 beneath a scattering station 1. A cut-off saw 5 is then used to separate the endless mat into mat sections 18 each of which is mounted on a respective mat carrier 17. The overlap between the mat carriers is eliminated and the laden mat carriers are removed from the forming conveyor 2 by an accelerating conveyor 6 which simultaneously operates as an intermediate store and a feed unit for a single storey press 8 arranged immediately after the accelerating conveyor 6. The accelerating conveyor 6 introduces the laden mat carrier into the inlet to the press from where it is transported into the press by internal transport devices of the press. After the mat section has been pressed to form a particleboard a pair of driven rollers 9 extract the mat carrier from the press and feed it towards a separating wedge 10. The mat carrier is deflected downwardly onto a conveyor 11 and the pressed board slides over the top surface of the separating wedge through further rollers 15. As soon as the mat carrier is fully located on a guide conveyor 11 beneath the separating wedge 10 the guide conveyor is pivoted downwardly and its direction of rotation is reversed so that the mat carrier can be transferred to a return conveyor 16. The mat carrier is then transferred back onto the forming conveyor from the return conveyor at a feeding station 14 which also serves to overlap the mat carrier with the preceding mat carrier and to turn the mat carriers over prior to them once again passing through the scattering station 1.

31 Claims, 12 Drawing Figures

METHOD OF MANUFACTURING PARTICLEBOARD AND THE LIKE

The invention relates to a method of manufacturing particle-board and the like from material comprising particles containing ligno-cellulose and/or cellulose together with at least one binder dispersed therein. The invention is also directed to apparatus suitable for carrying out the method.

In a known method of this kind a series of mat carriers arranged with predeterminable overlap on a forming conveyor are continuously moved beneath a stationary scattering device to produce an endless mat of particulate material on the mat carriers. The endless mat is subsequently divided into mat sections each of which is carried by a respective mat carrier. The overlap between the mat carriers is then eliminated and the laden mat carriers are conveyed to a press feeding station from which they are transferred into a discontinuously operating press where the mat sections are individually subjected to a pressing step to form boards. After the pressing step the mat carriers are separated from the boards, are returned for reuse and are once again arranged with overlap on the forming conveyor.

In a known method of this kind the mat carriers take the form of a flexible steel pallet or tray, sometimes called a caul, and the individual trays, together with their respectively associated mat sections are fed via transport devices to the stacker loader of a multistorey press. After the unloading of the multistorey press the individual mat carriers are directed via turning stations and transport conveyors back to the input side of the scattering device where they are once again deposited on the forming conveyor which passes beneath the scattering device and prepared for reuse.

Troublefree operation of an apparatus or installation constructed in accordance with this principle requires the speed of operation of the various sequential units of the total installation to be accurately matched to each other. It is thus necessary for the transport of the mat carriers to take place in a temporally accurate and predetermined manner. For this purpose the mat carriers are provided with apertures or portions of doubled thickness so that they may be engaged by transport devices and forwarded through the plant in accordance with the manufacturing cycle.

When it becomes necessary to change the board thickness and thus to change the time required to form the mat it is also necessary to accurately rematch the speeds of all the units which follow the mat forming zone and to synchronize these units. This requirement not only involves a certain degree of effort but also sets requirements for the operation of the total plant which are relatively strict and which thus increase the overall cost and complexity of the installation.

The principal object underlying the present invention is to provide a method of the initially defined type which makes it possible to manufacture both customary and modified particleboard, such as wafer board, OSB and MDF, to produce a high quality product at a high rate of output and which also makes it possible for the change-over from the manufacture of one board to the manufacture of boards of different thicknesses to be achieved without difficulty and in a manner which is simple to control.

This problem is solved in accordance with the invention in that a single storey press is used for the discontinuously operating press with the speed of the forming conveyor being controlled in dependence on the prevailing cycle time of this press; that the overlap of the mat carriers is eliminated by means of an accelerating conveyor which follows the forming conveyor and simultaneously serves as an intermediate store and press feed unit and that the mat carriers, which are each laden with a respective mat section and transferred by means of the accelerating conveyor into the press entry zone, are picked up and brought into the pressing position by transport devices which belong to the press and which clamp onto the side edges of the mat carriers.

The use of the invention makes it possible for the individual units needed to manufacture boards to cooperate without requiring any special synchronizing steps. As a result, in addition to a higher production output, the change-over from one board thickness to another is simplified. Moreover, special mat carriers adapted to match the transport devices by the provision of apertures, slot arrangements and the like are not required.

Although the method of the invention can be realized with simple technical control means, the fact that the speed of the forming conveyor carrying the mat carriers is controlled in dependence on the cycle time of the press makes it possible to ensure that a scattered mat section is ready at the entry to the press as the press opens, with the result that the capacity of an installation operating in accordance with the method of the invention can always be fully utilized. The accelerating conveyor is preferably driven independently of the speed of the forming conveyor and independently of the speed of the transport device belonging to the press so that this drive remains unchanged even with a change of the speed of the forming conveyor which is predetermined by the cycle time of the press.

The fact that the plot of the movement of the accelerating conveyor is fixed simplifies the execution of the multiple functions associated with this accelerating conveyor. In selecting the characteristics of this movement it is in general only necessary to ensure that a blank or mat section is ready for feeding to the press each time the press opens even at the maximum speed of the forming conveyor, i.e. when manufacturing boards with the lowest possible thickness which thus require the shortest possible press time.

A preferred apparatus for carrying out the method of the invention comprises a forming conveyor, which extends between a mat carrier feeding station and a mat carrier transfer station and is guided beneath a stationary scattering station for scattering a mat of particulate material onto mat carriers forwarded on said forming conveyor; a cut-off saw associated with said forming compressor for separating said mat into mat sections; a transport and storage unit for supplying the mat carriers which are each laden with a respective mat section to a manufacturing press and also return means for returning the mat carriers to the mat carrier feeding station with the apparatus being characterized in that the transport and storage unit for the laden mat carriers comprises an accelerating conveyor extending between the mat carrier transfer station and the manufacturing press, which consists of a discontinuously working single storey press; that the manufacturing press has its own transport device which clamps onto side edges of each mat carrier after an initial infeed movement of the mat carriers; that a device for separating pressed boards and mat carriers is provided at the outlet of the press, in combination with a reversible guide conveyor for returning the mat carriers without turning them over and that an arrangement for stepless adjustment of the over-lap of sequentially following mat carriers is arranged between the mat carrier return means and a mat feeding station which turns over the mat carriers and has a direction changing drum.

An apparatus or installation of this kind can be of very compactly constructed. This is particularly due to the multiple functions which are associated with the accelerating conveyor and to the special characteristics of the mat carrier return arrangement. The available stepless length adjustment, which can be readily coupled with a corresponding width adjustment of the mat under consideration, endows the total installation with a maximum degree of flexibility.

A stationary, continuously operating prepress unit working in conjunction with a high frequency heating device is preferably arranged between the stationary scattering device and the mat section cut-off saw which moves synchronously with the forming conveyor.

The use of a high frequency heating device, which makes it possible to reduce the cycle time, is also particularly advantageous when used in conjunction with the apparatus of the invention because the power output of a heating device of this kind can be rapidly matched without difficulty to the prevailing thickness of the mat. It will be remembered that a particular advantage of the installation of the invention is the fact that the transition from one mat or board thickness to another mat or board thickness can be realized without difficulty so that the use of a high frequency heating device is completely compatible with the aims of the invention.

The mat carriers that are used are preferably rectangular sheets of steel which are free of apertures and portions of increased thickness and which have a thickness in the range from approximately 0.8 mm to 2.5 mm and in particular a thickness in the range from 1.2 mm to 1.4 mm. The thermal behaviour of these simple mat carriers is good when compared with customary prior art mat carriers with portions of doubled thickness or apertures.

In accordance with the invention the pair of transport rollers at the output of the press is followed by a separating device with a stationary splitting wedge which engages between the mat carriers and the boards and deflects the mat carriers downwardly. A guide conveyor, the transport direction of which can be reversed and which is pivotable about its deflection axis remote from the manufacturing press, is then arranged beneath the splitting wedge to return the mat carriers to the forming conveyor.

The stationary splitting wedge is preferably of areal construction with a centrally and symmetrically disposed cut-out at its end adjacent the press. The effect of this cut-out is to divide the end of the splitting wedge into two relatively narrow wedge-shaped portions which are associated with the marginal regions of the mat carriers. These narrow wedge regions can then be reliably introduced, without difficulty, between the finished boards and the mat carriers. This process is aided by the provision in front of the splitting wedge of guide members for the longitudinal edges of the mat carriers with these guide members serving to deflect the edges of the mat carriers downwardly to form a gap or cleavage between each finished board and its associated mat carrier. Even with relatively wide mat carriers it is still only necessary to deflect the marginal regions of the resilient mat carriers downwardly from the flat finished board in order to ensure that the splitting wedge reliably engages in the cleavage. The separation of the boards from the mat carriers then continues quite straightforwardly because the guide members cause the resilient mat carriers to pass along the underside of the splitting wedge whereas the board is thrust forwardly and subsequently withdrawn over the large area, upper surface of the splitting wedge. The use of the centrally disposed symmetrical cut-out at the end of the splitting wedge adjacent the press means that disturbing edges are avoided which thus precludes shock-like loads or jamming during the separation procedure.

It will be seen that the mat carriers are only turned over once as they are returned to the start of the manufacturing cycle. Accordingly the mat sections are formed alternately first on one then on the other side of each of the mat carriers so that optimum thermal behaviour of the mat carriers can be ensured. This avoids the danger of distorsion.

The separating device used in accordance with the invention has the particular and special advantage that it functions independently of the kind of mat carrier that is being used and has no movable parts.

The guide conveyor section disposed beneath the splitting wedge can be pivoted downwardly as soon as one of the mat carriers is completely located thereon. During this pivotal movement of the guide conveyor section the mat carriers are not turned over and are simply led via a return conveyor, which directly adjoins the guide conveyor section in the downwardly pivoted position of the latter, to the turning and feeding station.

The apparatus of the invention is also intended to allow successive mat carriers to be accurately overlapped by steplessly predeterminable amounts using simple means and indeed independently of the form and construction of the mat carriers.

This object is satisfied by an arrangement in which the continuously driven forming conveyor and a device which partially surrounds the deflection drum for the forming conveyor in order to press the mat carriers onto the forming conveyor together form an intake slot for the mat carriers, there being a support table provided between the return conveyor for returning the mat carriers and the intake slot, with the support table being disposed beneath the plane of the return conveyor and at least substantially aligned with the base of the intake slot and with the arrangement having the further features that the plane of the return conveyor is extendible by means of telescopic extensible support arms in dependence on the time at which the rear edge of a mat carrier which has already been picked up by the forming conveyor leaves the return conveyor, that a stationary positioning end switch is provided on the support arms with the positioning end switch being actuatable by the front edge of a mat carrier to stop the return conveyor and that a control switch which switches the drive of the return conveyor to the speed of the forming conveyor and initiates the retraction of the support arms is associated with the support table with the control switch being steplessly positionable along this table and responding to the rear edge of a mat carrier which is entering into the intake slot.

This arrangement avoids the need to use any form of special driven, gripping elements which means that mat carriers of any desired kind can be overlapped to produce a layered arrangement following the overlapping in which, during transport on the forming conveyor, the front edge of one mat carrier overlaps the rear edge of the preceding mat carrier. The fact that the control of the overlapping procedure depends purely on the relative movements of succeeding mat carriers makes it possible to adjust the width of overlap in a particularly simple manner simply by displacing a switch.

In accordance with a further embodiment of the invention the separating device is followed by a thickness measuring device which continuously detects the actual thickness of each manufactured board by means of several measuring heads, with a respective correction position in the manufacturing press being associated with each measuring point of this thickness measuring device.

In a preferred single storey manufacturing press which is of simple construction and which also allows corrections to be made to the thickness of the pressed board, exchangeable correction inserts, which are subjectable to the press pressure, are provided on the surface remote from the press chamber of at least one of the two press plattens of the single storey press, with the correction inserts extending across the width of the press with their side faces adjacent one another and with each correction insert being associated with at least one measurement point of the thickness measuring device.

These correction inserts, which can be of different thicknesses and can consist of insulating material or metal, make it possible, in principle, to carry out a very accurate correction at each point of the press platten in dependence on the results of the measurement so that boards are produced which satisfy the highest demands, particularly with regard to dimensional accuracy.

The correction inserts can also be spaced apart in the longitudinal direction of the press and are preferably arranged on throughgoing press strips which extend over the width of the press platten (s). This special feature of the invention makes it particularly simple to effect corrections because a pack of correction inserts arranged alongside and above one another on a press strip can be withdrawn sideways from the press together with the press strip, can be changed, or shuffled, in accordance with the corrections that are required, and can be pushed sideways back into the press with the press strip. Errors can be almost entirely avoided by numbering the measurement points and the correction inserts associated with the measurement points so that there is a clear association between the two.

The invention will now be described in more detail with reference to the embodiments shown in the drawings in which FIG. 8 is a schematic longitudinal section of a part of a press which can be used in an apparatus in accordance with the invention, FIG. 9 is a schematic detail view of a correction unit of the press of FIG. 8, FIG. 10 is a schematic plan view of a press and measuring device to explain the correction principle.

Figure 1:
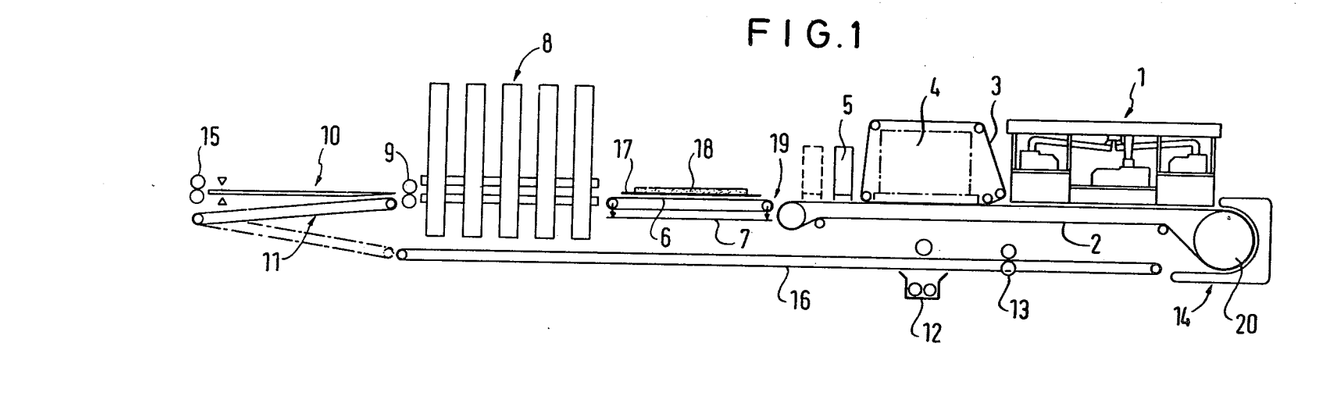
FIG. 1 is a schematic illustration of an embodiment of an apparatus in accordance with the invention.

As seen in FIG. 1 a continuously driven forming conveyor 2 is passed beneath a stationary scattering device 1. The scattering device 1 is followed by a roller compressor 3 with a high frequency heating device 4 which is then followed in turn by a mat section cut-off saw 5 which is compulsorily driven by the forming conveyor.

The cut-off saw 5 can be of the customary type which cuts a strip out of the endless scattered mat at each point of overlap of the mat carriers. The material contained in the strip is sucked away in the customary manner and once more returned to the scattering station. These features are not shown in the drawing but will be readily understood by those skilled in the art.

The forming conveyor 2 is fed around a direction reversing drum 20 of comparatively large diameter in a mat carrier feeding station 14. The feeding station serves to lay mat carriers in the form of rectangular sheets of steel in an ordered manner, and with a predetermined overlap, on the forming conveyor so that a series of mat carriers with defined overlap is continuously transported through the stationary scattering device 1. An endless mat is formed on these mat carriers by means of the scattering device 1. The endless mat is divided by means of the cut-off saw 5 into sections the length of which can be steplessly selected by varying the overlap of the mat carriers. The mat carriers each laden with a mat section 18 of a predetermined format are fed into an accelerating conveyor 6 at a mat carrier transfer station 19. The distance between the axles of the accelerating conveyor 6 preferably corresponds to the length of a mat carrier 17.

This accelerating conveyor serves, on the one hand, to eliminate the overlap between successive mat carriers and, on the other hand, to bring each laden mat carrier comparatively quickly into a press feeding position. An operator can survey the quality of the scattered mat at this point and, in addition, a weighing machine or scale 7 can also determine the weight of the mat section. The ability to recognize a defective scattered mat section by direct observation or by weighing makes is possible to return the scattered material to a clearance station 12. For this purpose the accelerating conveyor 6 can be constructed so that its direction of movement can be reversed and so that it can be pivoted downwardly to feed the defective scattered mat section to a return conveyor 16 which rapidly conveys it to the clearance station 12.

The accelerating conveyor 6, which simultaneously serves as a storage conveyor, is followed by a single storey press, the laden mat carrier passes from the accelerating conveyor into the press as the press opens. The loading of this press takes place in such a way that as one finished board is withdrawn from the press together with its carrier a further mat carrier 17 located in the waiting position, together with the mat section or blank located thereon, is simultaneously introduced into the press entry zone by means of the accelerating conveyor. Once in this entry zone the mat carrier 17 is picked up by a transport device belonging to the press. The speed of the transport device during change over of the press from one mat section to another can for example lie in the range from 100 to 160 m per minute.

The transport device belonging to the press will later be described in more detail with reference to FIGS. 11 and 12 which show the important elements of this transport device. It suffices here to say that the transport device grasps the side edges of the mat carriers 17 by means of clamp members which are carried by chain conveyors and which engage on the mat carriers 17 when the chain speed is the same as or larger than the instantaneous speed of the mat carrier which is to be transported through the press. The compulsory, relative velocity dependent, multiple point coupling between the transport device and the mat carriers makes it possible, to accurately and precisely control the transport of the mat carriers through the press. At the same time it allows the mat carriers to be supplied at a higher speed to the transport device by means of the accelerating conveyor 6 and to be withdrawn at a higher speed from the transport region by means of a pair of driven rollers 9. It will be seen that the transport device of the press 8 acts as an overrun device.

The single storey press 8 is followed by a separating device 10 to which the finished pressed boards are supplied together with their mat carriers, via the pair of transport rollers 9.

Figure 2:
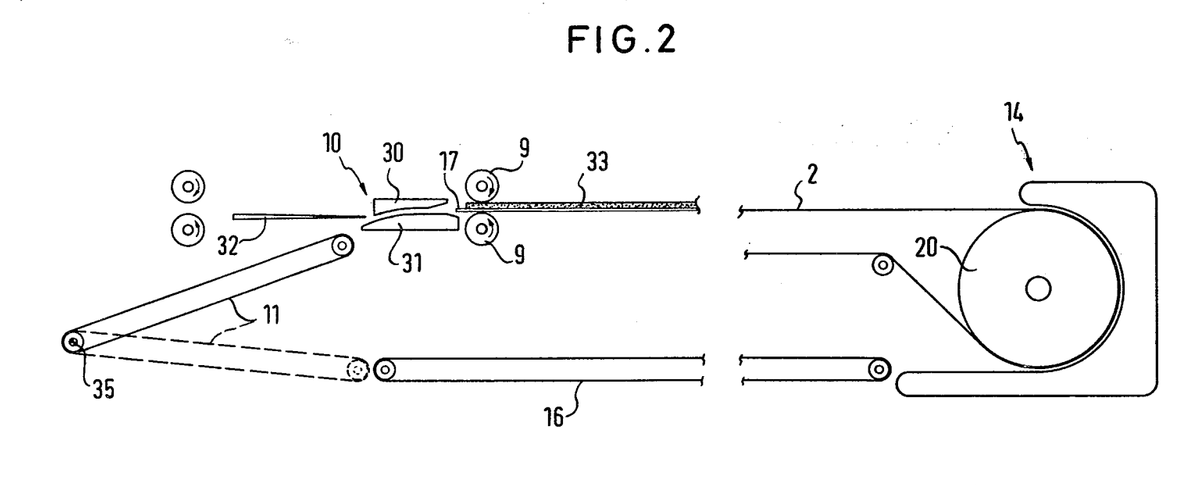
FIG. 2 is a schematic illustration of part of the apparatus of FIG. 1 as used to separate mat carriers and finished boards and to return the mat carriers to a forming conveyor.

The separating device 10, which is shown in more detail in FIG. 2, includes guide members 30, 31 which engage on the marginal regions of the mat carriers 17. The guide members 30, 31 are followed by a splitting wedge 32 of shallow, areal construction which engages between the mat carriers 17 and the finished boards 33. During the separating procedure the finished board 33 is pushed over the splitting wedge 32 whereas the mat carrier 17 is deflected downwardly onto a guide conveyor 11.

This guide conveyor 11, the direction of transport of which is reversible, can be pivoted downwardly about the conveyor axle 35 which is remote from the feed side.

If the guide conveyor section 11, after picking up a mat carrier 17, is pivoted downwardly into the position shown in broken lines the mat carrier 17 can then be transferred, without being turned over, to a return conveyor 16 which returns the unturned mat carrier to the feed station 14. At this feeding station the mat carrier is picked up by the forming conveyor, which is tensioned around the deflection drum 20, and is deposited on the upper run of the forming conveyor while being simultaneously turned over.

As a result each of the mat carriers circulating around the apparatus is turned over once per cycle so that mat material is deposited first on the one side and then on the other side of the mat carrier. The turning over of the mat carriers, which preferably consist of resilient sheets of steel without any form of openings or projections, optimizes the thermal behaviour of the mat carriers and substantially prevents distorsion thereof.

Figure 3:
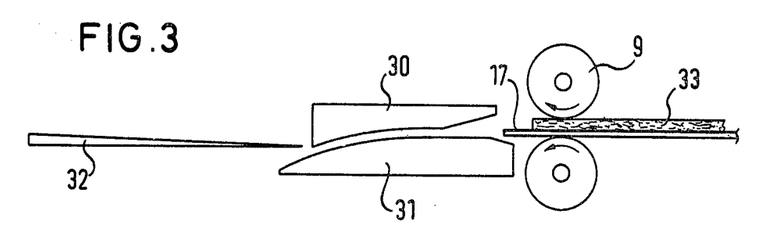
FIGS. 3 to 5 are schematic side views for explaining the separating step.
Figure 4:
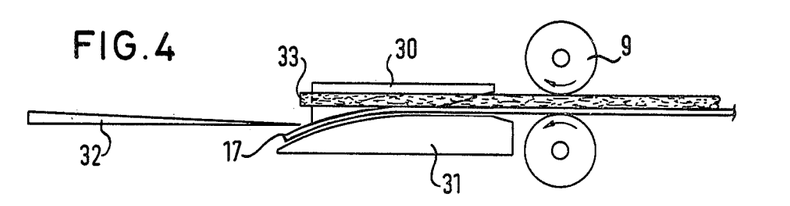
Figure 5:
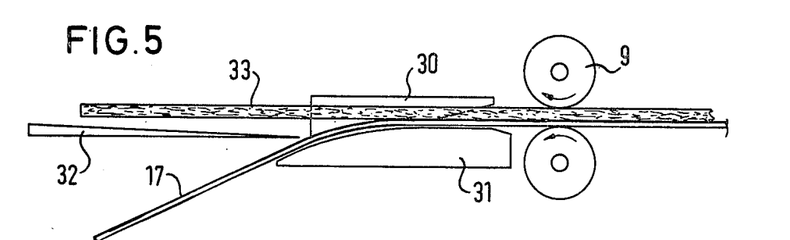

FIGS. 3 to 5 show, to a larger scale, the separating device 10 at various stages during the separating procedure with FIG. 3 starting at approximately the same stage as is shown in FIG. 2.

At the stage shown in FIG. 4 the mat carrier 17 and finished board assembly 33 has already been thrust into the separating device by means of the transport device 9 of the press. During this movement the side disposed guide members 30 and 31 have deflected the longitudinal side edges of the reslient mat carriers 17 downwardly so that a cleavage or a gap develops between the mat carrier and the board particularly at the side regions. The separating wedge 32 can engage in this gap and separate the board from the mat carrier. The separating procedure is well advanced by the time the mat carrier and board have reached the positions shown in FIG. 5 in which the board is guided upwardly over the top surface of the splitting wedge whereas the mat carrier 17 continuous to be deflected downwardly towards the guide conveyor.

Figure 6:
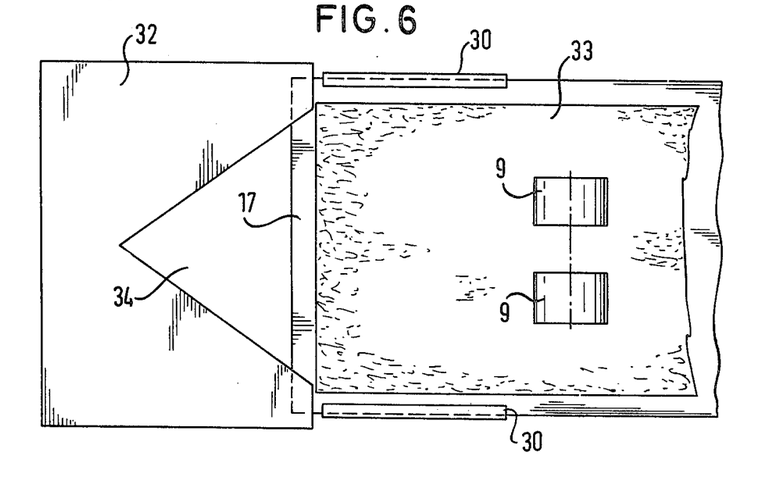
FIG. 6 is a schematic plan view of the separating device of of FIGS. 2 to 5.

A preferred embodiment of the separating or splitting wedge 32 is shown in the plan view of FIG. 6 which also shows the position of the upper guide members 30. It can be seen from FIG. 6 that the splitting wedge, which preferably has a V-shaped cut-out 34, initially only engages in the side regions between the finished board 33 and the mat carrier 17.

It should be noted that the guide elements 30, 31 only deform a relatively small marginal region of the resilient sheet steel mat carrier 17 and that during this deformation the larger part of the board surface still contacts the mat carrier and is supported.

It can also be seen that the separating device of the invention avoids shock-like loads and jamming during the separating step and operates in a problemfree manner when using either resilient mat carriers with slots and apertures or mat carriers without any form of cut-out.

The desired overlap between successive mat carriers is produced in the overlapping station which is associated with or immediately precedes the feeding station 14. In the illustrated embodiment the overlapping station is provided between the return conveyor 16 and the intake slot of the feeding station.

Figure 7:
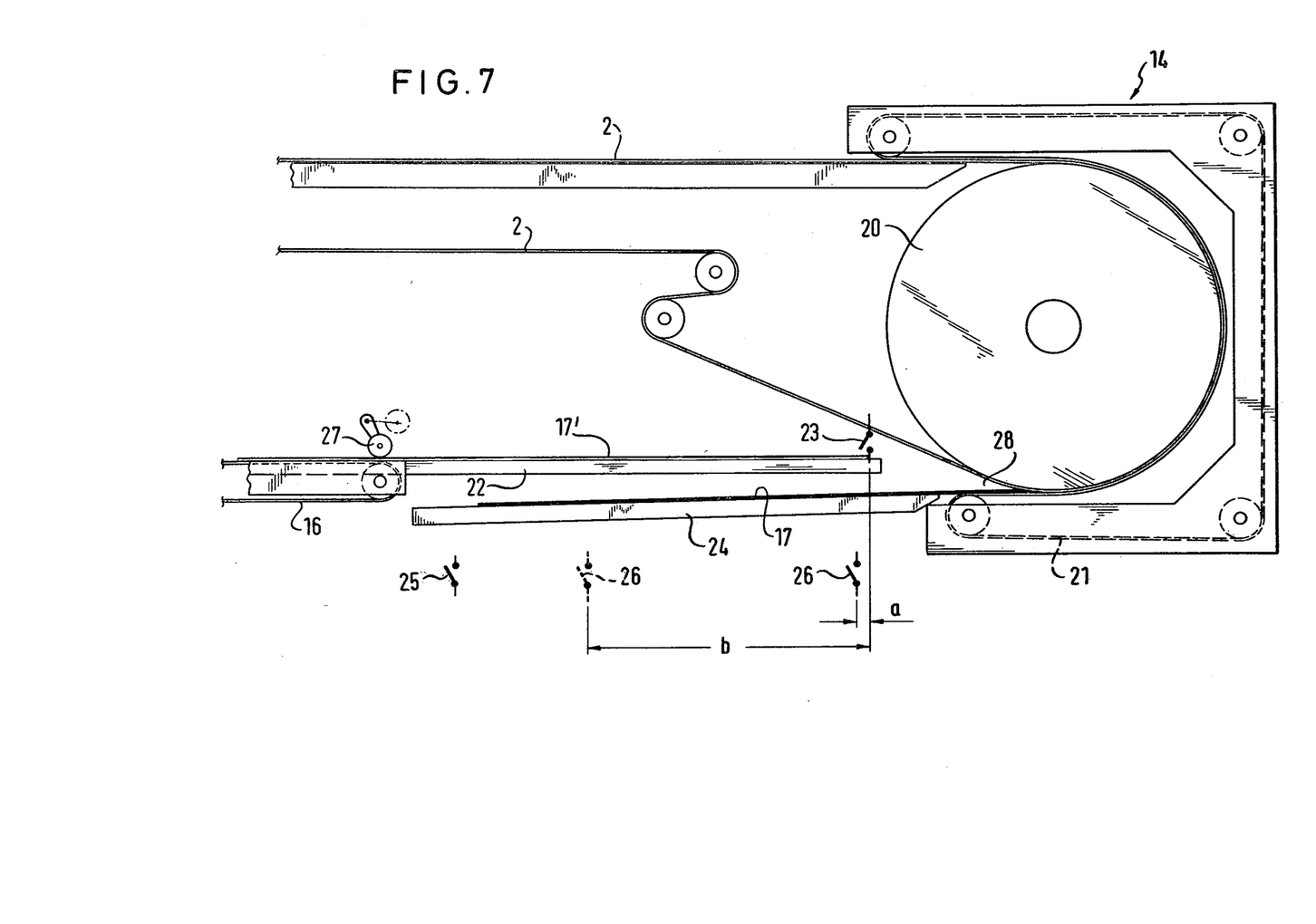
FIG. 7 is a schematic illustration of a part of the apparatus of FIG. 1 which brings about overlapping of the mat carriers.

As shown in FIG. 7 the forming conveyor 2 is guided around a relatively large diameter deflection drum 20 of the feeding station 14. A counter pressure device, which can for example consist of several adjacent belts 21 guided via rollers, is tensioned around the forming conveyor 2 over at least that peripheral region of the drum 20 which is contacted by the forming conveyor 2.

The circulating belts 21 of the counter pressure device form, together with the lower run of the forming conveyor 2 an intake slot 28.

Mat carriers 17, 17' which continuously circulate around the apparatus are fed one after the other to the intake slot 28 by means of the the return conveyor 16.

For this purpose a support table 24 is arranged between the return conveyor and the intake slot 28 with the plane of the support table being at least substantially aligned with the lower plane of the intake slot.

The return conveyor 16 has extensible and retractable support arms 22, which are preferably of telescope-like construction with a positioning end switch 23 being fixed to the front ends of the support arms.

A switch 25 which can be actuated by the downwardly falling end of a mat carrier is associated with the return conveyor side of the support table 24.

In addition, the support table is equipped with a control switch 26 the position of which can be adjusted in the longitudinal direction of the support table. The control switch 26 can be actuated by the rear edge of a mat carrier entering into the intake slot 28.

The above described feed station operates as follows:

When the rear edge of a mat carrier 17 which has been picked up by the forming conveyor 2 leaves the return conveyor 16 and falls onto the support table 24 the switch 25 is actuated. The actuation of the switch 25 causes the support arms to be extended and the return conveyor 16 which previously ran at the same speed as the forming conveyor is accelerated and the subsequent mat carrier 17' is pushed onto the extended support arms 22 until its front edge contacts the end switch 23 with the result that this mat carrier 17' is accurately positioned. This positioning has been completed before the rear edge of the departing mat carrier 17 has actuated the steplessly adjustable control switch 26 in the support table 24.

When this control switch 26, the position of which determines the size of the overlap is actuated the return conveyor 16 immediately drives the mat carrier 17' at the speed of the forming band conveyor, that is to say that from this point on the two mat carriers which are to be overlapped move with the same speed in the direction of the intake slot 28. During this synchronous movement of the two mat carriers the support arms 22 are once more withdrawn whereupon the following mat carrier 17' is progressively lowered onto the preceding mat carrier 17 and comes to rest on this mat carrier 17 without mutual relative displacement. As soon as both mat carriers have reached the end of the intake slot 28 the overlap is fixed by the clamping effect between the forming conveyor and the counter pressure device and the forming conveyor takes over the transport of the two overlapped mat carriers.

The reliability of the mat carrier transport can be increased by means of loose, free running rollers 27 at the end of the return conveyor 16. This arrangement means that the size of overlap can not only be very accurately adjusted but cann also be varied over a large range. The drawing illustrates the minimum overlap at "a" and the maximum overlap at "b".

Turning now to FIG. 8 there is shown a longitudinal sectional view of a basic construction of the single storey press used in the apparatus of the invention. This press includes a lower heatable platten 40 which serves to support the mat section 18 which is to be pressed. This mat section is located on a mat carrier 17. The lower press frame has been omitted from the drawing in order to simplify the illustration. The construction of this press frame will however be readily apparent to those skilled in the art.

The upper heatable press platten 41 is fastened by means of retaining cylinders 42, 43 to a press beam 44 which is connected in turn via press cylinders 45, 46 with the fixed, upper press frame 47.

The press beam 44 has several webs 48, 49, 50 which transmit the press forces via, in the illustrated embodiment, insulating bodies 51, 52, 53 in the form of strips, beams or the like to the upper press platten 41 on closing the press.

Press strips 54, 55, 56 and also, if required, correction inserts 57 to 62 (which will later be described in more detail) are arranged between the insulating bodies 51, 52 and 53 and the upper press platten 41.

Further insulating bodies 63 to 66 are arranged between the pressure transmitting insulating bodies 51, 52 and 53 or the press strips 54, 55 and 56 so that the upper press platten 3 is fully insulated over its whole surface.

The form and arrangement of the correction inserts 57 to 62 is important in the context of the described press. These correction inserts are rectangular or square elements of metal or insulating material which are respectively associated with at least one measuring point of a thickness measuring device which measures the thickness of the boards produced in the press. The correction inserts, which are used to correct the thickness of the manufactured board can be inserted, removed or allowed to remain in place depending on the outcome of each measurement.

Although it is in principle possible to allow the webs 48, 49 and 50 to act directly on the upper press platten 41 via the correction inserts it is preferable for the previously mentioned insulating bodies 51 to 53 and also the press strips 54, 55, 56 which extend across the entire width of the press to be inserted in the force transmission path. The press strips 54, 55 and 56 act as carriers for the correction inserts and are preferably arranged so that they can be withdrawn sideways from the press together with the correction inserts that are located thereon.

In order to ensure accurate positioning of the press strips, correction inserts and insulating bodies, and also to ensure accurate positioning of the insulating elements 63 to 69 between the pressure transfer zones, strips of steel or insulating material 67, 68, 69, 70, 71, 72 are provided with these strips extending across the width of the press to form reception channels of U-shaped cross-section for the correction inserts.

The detail illustration of FIG. 9 shows the pressure transfer path when the press is closed with an insulating body 53, several correction inserts 61, 62 and a press strip located between the web 50 and the upper press platten 41.

Vertically extending walls 71, 72 are fastened to the sides of the press strip which extends over the whole width of the press platten 41 so that the press strip together with these walls forms a U-shaped channel which serves to accept the correction inserts and also to hold and guide the insulating bodies, when such insulating bodies are used. Eyes or the like are indicated at the end faces of the illustrated press strip. These eyes make it possible to hook in a suitable tool and to withdraw the press strip, together with the correction inserts thereon, sideways out of the press when the press is opened. In this way the correction inserts can be readily interchanged as necessary in dependence on the result of the measurement.

If metal strips are used for the press strips the vertical side walls 71, 72 are usefully attached to the press strip by means of weld beads 73, 74.

If it is not possible to withdraw a pack of correction strips sideways, in particular when operating without a press strip, then the correct positioning of the correction inserts can take place when the press is open. This is of course somewhat more complicated but can in principle also be realized.

The schematic illustration of FIG. 10 shows a measuring device in which a plurality of measuring head pairs 81 are arranged alongside one another on a torsionally stiff cross beam 82. the measuring head pairs make it possible to accurately specify the thickness of the pressed board at predetermined measuring points 83.

One correction position inside the press is associated with each of the measuring points 83 that are used during the measuring step. In this way accurate multiple point corrections can be carried out either over the entire surface of the press platten or in spaced apart regions which extend transversely over the width of at least one of the press plattens.

FIG. 10 shows the case in which the thickness correction is carried out by means of a correction device as shown in FIG. 8. It can clearly be seen that one correction insert is associated with each measurement point 83. These correction inserts are designated in FIG. 10 with the reference numerals 84 to 107.

The correction inserts are interchangeable in the manner mentioned above and are arranged with their side edges adjacent one another. Correction inserts which lie in the same plane can lie with their side edges directly abutting whereas other inserts are merely arranged with their side edges aligned in a vertical plane in order to ensure an accurate association between the measuring points and the correction points. In order to ensure that both plus and minus tolerances can be compensated when commissioning a press, one arranges correction inserts between the webs 30 and the press platten in question (this can be either the upper and/or the lower press platten). These correction inserts are preferably of differential thickness. The measurement point dependent correction can then take place by adding further correction inserts or by removing correction inserts. Although the described correction inserts can in principle be provided for both press plattens it is as a rule sufficient to use correction inserts only in connection with one of the press plattens.

It should also be mentioned that the dimensions of a correction insert in the transverse direction of the press does not necessarily have to correspond with the dimensions of a correction field as shown in FIG. 10. In practice it is possible for adjacent measuring points to provide substantially the same values which can then be compensated as required by a correction insert which covers at least two correction fields. It should also be mentioned that a press of the kind described is naturally also suitable for pressing mats without mat carriers. Presses of the above described kind can also be used as laminating presses.

The described apparatus which, if required, can be modified for different products by installing different forming devices on the same forming conveyor, is characterized by its high output and by the high degree of flexibility that it offers. This flexibility arises, on the one hand, from the basic concept of the installation and the defined cooperation of the individual units and, on the other hand, as a consequence of the use of simple mat carriers with good thermal behaviour, of the use of simple stepless length and width adjustment of the mat sections, of the possible use of a continuously operating prepress and the possible use of a high frequency heating device.

The arrangement and manner of operation of the transport device belonging to the single storey press will now be described with reference to FIGS. 11 and 12.

Figure 11:
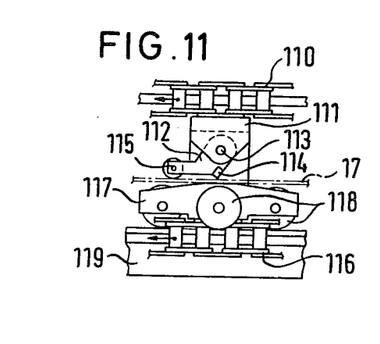
FIG. 11 is a side view of a transport device incorporated in the press of FIG. 8
Figure 12:
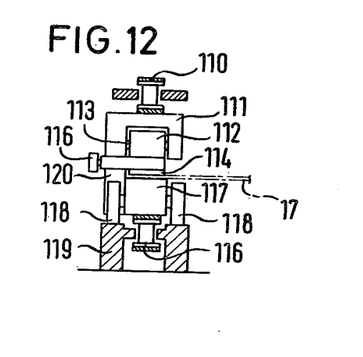
FIG. 12 is an end view of the transport device of FIG. 11.

The side view of FIG. 11 shows one transport device which is supported on upper and lower drive chains 110, 116. These two chains are synchronously driven in a closed loop about two pairs of chain wheels (not shown) that are arranged at the inlet to and the outlet from the press. Arrangements of this kind are provided at both sides of the press so that the transport devices can engage on both sides of the mat carriers. Although FIGS. 11 and 12 show only a single transport device it will be appreciated that a plurality of such transport devices are provided on the synchronously driven chains 110, 116.

One transport device will now be described in detail. The transport device basically consists of a pivotally mounted clamping lever 112 which is fastened to a U-shaped carrier 111 which is fixedly mounted to the upper chain. The pivot axis 113 of the clamping lever 112 extends transversely to the direction of transport illustrated by the arrows in FIG. 11 Beneath the lever 112 there is provided a carriage 117 which runs via wheels 118 on two rails 119. The carriage is supported by these rails but driven by the lower chain 116 which runs between the rails. The top surface of the carriage forms a support for a side edge of a mat carrier 17 and the mat carrier is clamped in position on this surface by the pivotally mounted clamping lever 112. The effective length of the clamping lever is selected to be somewhat larger than the vertical distance between the pivot axis 113 and the mat carrier 117 so that the clamping lever always wedges on the mat carrier under its own weight. An exchangeable wear element 114 is provided on the clamping lever at its point of contact with the mat carrier. The carriage 117 and the carrier 111 are joined together at the outside of the press so as to form a rigid unit. Each clamping lever is also provided with control lever 115 which carries a freely rotatable roller 116 at its front end. The roller is able to engage in curved guides (not shown) provided at the entry and exit of the press. These curved guides serve to engage the clamping lever and to disengage the clamping lever by producing respective downward and upward movements of the roller 116 and thereby of the clamping lever 112.

It will be appreciated that the mat carrier 17 can be easily pushed past the clamping lever 112 in the direction of the arrows of FIG. 11. This movement, which corresponds to the mat carrier moving at a greater speed than the transport device merely serves to lift the clamping lever out of clamping engagement. If, on the other hand, the transport device is moving at the same speed as or faster than the mat carrier 17 the clamping lever will move under its own weight, and then under frictional drag forces, to firmly clamp on the mat carrier so that the mat carrier is drawn through the press by the transport device. It will thus be seen that the accelerating conveyor can readily supply the mat carrier to the press, and that the driven rollers 9 can readily remove the mat carrier from the press, without there being any need to synchronize the transport devices in the press with either the accelerating conveyor or the driven rollers 9.

We claim:

1. A method of manufacturing particleboard and the like from material comprising particles containing ligno-cellulose and/or cellulose together with at least one binder dispersed therein, wherein a series of mat carriers arranged with predeterminable overlap on a forming conveyor are continuously moved beneath a stationary scattering device to produce an endless mat of said material on said mat carriers, said endless mat is subsequently divided into mat sections each of which is carried by a respective mat carrier, the overlap between the mat carriers is eliminated and the laden mat carriers are conveyed to a press feeding station from which they are transferred into a discontinuously operating press where the mat sections are subjected to a pressing step to form boards and wherein, after the pressing step, the mat carriers are separated from the boards, are returned for reuse and are once again arranged with overlap on the forming conveyor, wherein a single storey press is used for the discontinuously operating press, the speed of the forming conveyor is controlled in dependence on the prevailing cycle time of said single storey press; the overlap of the mat carriers is eliminated by means of an accelerating conveyor which follows said forming conveyor and simultaneously serves as an intermediate store and as a feed unit for said single storey press; the accelerating conveyor is driven independently of the speed of the forming conveyor and independently of the speed of the transport device belonging to the press; the mat carriers which are each laden with a respective mat section are transferred by means of the accelerating conveyor into the press entry zone, are picked up by the said transport device which clamps onto side edges of the mat carriers and brings them into position in said single storey press; and wherein after each pressing step, the mat carriers together with the respectively associated boards are transported out of the press and thereby separated from one another, whereupon the mat carriers are returned, without being turned over, to a feeding station where they are once again laid on the forming conveyor with the required overlap and are simultaneously turned over.

2. A method in accordance with claim 1 and wherein before dividing the endless mat into individual sections it is compressed and heated with high frequency energy.

3. A method in accordance with claim 1 and wherein the transport device belonging to the single storey press is activated to clamp onto a mat carrier when the speed of that mat carrier during feeding thereof into the press or transport thereof out of the single storey press is the same as or smaller than the transport speed of said transport device.

4. Apparatus for manufacturing sections of particleboard comprising a forming conveyor, which extends between a mat carrier feeding station having a direction changing drum for turning over the mat carriers and a mat carrier transfer station and is guided beneath a stationary scattering station for scattering a mat of particulate material onto mat carriers forwarded on said forming conveyor; means for continuously driving said forming conveyor; a cut-off saw associated with said forming conveyor for separating said mat into mat sections; a transport and storage unit for supplying the mat carriers, which are each laden with a respective mat section, to a manufacturing press; and also mat carrier return means for returning the mat carriers to the mat carrier feeding station; wherein the transport and storage unit for the laden mat carriers comprises an accelerating conveyor extending between said mat carrier transfer station and said manufacturing press, said manufacturing press consisting of a discontinuously working single storey press having its own transport device which clamps onto side edges of each mat carrier after an initial infeed movement of the mat carriers; a device for separating pressed boards and mat carriers; and a reversible guide conveyor provided at the outlet of the press for returning the mat carriers without turning them over; and wherein means for steplessly adjusting the overlap of sequentially following mat carriers is arranged between said mat carrier return means and said mat carrier feeding station.

5. Apparatus according to claim 4 wherein a stationary, continuously operating prepress unit with a high frequency heating device is arranged between said stationary scattering device and said cut-off saw which moves synchronously with said forming conveyor.

6. Apparatus according to claim 5 wherein a weighing machine for determining the weight of the mat sections is associated with said accelerating conveyor which, depending on the result of the weighing operation, can be lowered and reversed to serve as a transport unit for returning defective mat sections to a clearance station.

7. Apparatus according to claim 5 wherein the mat carriers, which are identical to one another, consist of plain rectangular sheets of steel without apertures or portions of doubled thickness and have a thickness in the range from approximately 0.8 mm to 2.5 mm, and in particular a thickness in the range from 1.2 mm to 1.4 mm.

8. Apparatus according to claim 5 wherein at least one pair of transport rollers is provided at the output of the manufacturing press to take over mat carriers and finished boards from the transport device belonging to the press, with the speed of advance of the pair of transport rollers being the same as or larger than the transport speed of said transport device.

9. Apparatus according to claim 8 wherein the transport rollers are followed by a separating device with a stationary spliting wedge which engages between the mat carriers and the boards and deflects the mat carriers downwardly, and wherein a guide conveyor, the transport direction of which is reversible and which is pivotable about an axis remote from the manufacturing press is arranged beneath the splitting wedge.

10. Apparatus according to claim 8 wherein the stationary splitting wedge which is of areal construction has a centrally and symmetrically disposed cut-out which is at least substantially V-shaped, forming narrow side regions of said splitting wedge on either side of said cut-out and wherein said narrow side regions are associated with longitudinal edge regions of the mat carriers.

11. Apparatus according to claim 8 wherein guide members in the form of deflecting rails for the longitudinal edge regions of the mat carriers are arranged in front of the splitting wedge and depress the margins of the mat carriers downwardly to form a cleavage for the entry of the narrow end of the splitting wedge between the mat carriers and the boards.

12. Apparatus according to claim 8 wherein said guide conveyor section forms a continuation of the guide track of the deflecting rails.

13. Apparatus according to claim 5 wherein said forming conveyor and a device which partially surrounds said direction changing drum to press the mat carriers onto the forming conveyor together form an intake slot for the mat carriers; said mat carrier return means comprises a return conveyor; a support table is provided between said return conveyor and said intake slot, with said support table being disposed beneath a plane containing said return conveyor and at least substantially aligned with a base of said intake slot; telescopic support arms extensible from said return conveyor towards said intake slot when a rear edge of a mat carrier which has already been picked up by said forming conveyor leaves said return conveyor, a stationary positioning end switch provided on said support arms with the positioning end switch being actuatable by a front edge of a mat carrier to stop the return conveyor; and a control switch associated with said support table for switching the return conveyor to the speed of said forming conveyor and for initiating retraction of said support arms, said control switch being steplessly positionable along said table and responding to said rear edge of the mat carrier when this mat carrier enters the intake slot.

14. Apparatus according to claim 13 wherein extension of said support arms is coupled with an increase in speed of said return conveyor.

15. Apparatus according to claim 14 wherein the time at which said rear edge of the mat carrier leaves said return conveyor is detected by an initiating switch which is associated with said support table and actuated by downward movement of said rear edge.

16. Apparatus according to claim 13 wherein the speed of said return conveyor during extension of said support arms is selected so that actuation of said stationary end switch always precedes actuation of said control switch.

17. Apparatus according to claim 5 and wherein said separating device is followed by a thickness measuring device having several spaced apart measuring heads for determining the actual thickness of each manufactured board at several positions across and along each board, wherein correspondingly disposed correction positions are provided in said manufacturing press one associated with each said measuring positions, and wherein means are provided at said correction positions for correcting the thicknesses of subsequent boards.

18. Apparatus in accordance with claim 17 wherein said means provided at said correction positions for correcting the thickness of subsequent boards comprise exchangeable correction inserts.

19. Apparatus according to claim 18 wherein said correction inserts are spaced apart in the longitudinal direction of the press.

20. Apparatus according to claim 19 wherein said correction inserts consist of insulating material.

21. Apparatus according to claim 18 wherein said correction inserts are held in channels of U-shaped cross-section which are arranged on press strips extending over the whole width of the press platten.

22. Apparatus according to claim 21 wherein means are provided for withdrawing said inserts together with said press strips from, and for inserting said inserts together with the press strips into said press from a side of said press.

23. Apparatus in accordance with claim 18 and wherein said single storey press comprises first and second press plattens with a press chamber defined therebetween and wherein said inserts are provided on a side of one of said press plattens remote from said press chamber.

24. Apparatus according to claim 19 wherein said correction inserts consist of metal.

25. Apparatus for manufacturing sections of particleboard comprising a forming conveyor, which extends between a mat carrier feeding station having a direction changing drum for turning over the mat carriers and a mat carrier transfer station and is guided beneath a stationary scattering station for scattering a mat of particulate material onto mat carriers forwarded on said forming conveyor; means for continuously driving said forming conveyor; a cut-off saw associated with said forming conveyor for separating said mat into mat sections; a transport and storage unit for supplying the mat carriers, which are each laden with a respective mat section, to a manufacturing press; and also mat carrier return means for returning the mat carriers to the mat carrier feeding station; wherein the transport and storage unit for the laden mat carriers comprises an accelerating conveyor extending between said mat carrier transfer station and said manufacturing press, said manufacturing press consisting of a discontinuously working single storey press having its own transport device which clamps onto side edges of each mat carrier after an initial infeed movement of the mat carriers; at least one pair of transport rollers provided at the output of the manufacturing press to take over mat carriers and finished boards from the transport device belonging to the press, the speed of advance of the pair of transport rollers being the same as or larger than the transport speed of said transport device; the transport rollers followed by a device for separating pressed boards and mat carriers including a stationary splitting wedge engaging between the mat carriers and the boards to deflect the mat carrier downwardly; and a reversible guide conveyor provided at the outlet of the press beneath the splitting wedge for returning the mat carriers without turning them over, the transport direction of which is reversible, the reversible guide conveyor being pivotable about an axis remote from the manufacturing press; and wherein means for steplessly adjusting the overlap of sequentially following mat carriers is arranged between said mat carrier return means and said mat carrier feeding station.

26. Apparatus for manufacturing sections of particleboard comprising a forming conveyor, which extends between a mat carrier feeding station having a direction changing drum for turning over the mat carriers and a mat carrier transfer station and is guided beneath a stationary scattering station for scattering a mat of particulate material onto mat carriers forwarded on said forming conveyor; said forming conveyor including means for partially surrounding said direction changing drum to press the mat carriers onto the forming conveyor and which together form an intake slot for the mat carriers; means for continuously driving said forming conveyor; a cut-off saw associated with said forming conveyor for separating said mat into mat sections; a transport and storage unit for supplying the mat carriers, which are each laden with a respective mat section, to a manufacturing press; and also mat carrier return means for returning the mat carriers to the mat carrier feeding station, said mat carrier return means including a return conveyor; a support table provided between said return conveyor and said intake slot, said support table being disposed beneath a plane containing said return conveyor and at least substantially aligned with a base of said intake slot; telescopic support arms extensible from said return conveyor towards said intake slot when a rear edge of a mat carrier, which has already been picked up by said forming conveyor, leaves said return conveyor; a stationary positioning end switch provided on said support arms with the positioning end switch being actuable by a front edge of a mat carrier to stop the return conveyor; a control switch associated with said support table for switching the return conveyor to the speed of said forming conveyor and for initiating retraction of said support arms, said control switch being steplessly positionable along said table and responding to said rear edge of the mat carrier when this mat carrier enters the intake slot; wherein the transport and storage unit for the laden mat carriers comprises an accelerating conveyor extending between said mat carrier transfer station and said manufacturing press, said manufacturing press consisting of a discontinuously working single storey press having its own transport device which clamps onto side edges of each mat carrier after an initial infeed movement of the mat carriers; a device for separating pressed boards and mat carriers; a reversible guide conveyor provided at the outlet of the press for returning the mat carriers without turning them over; and wherein means for steplessly adjusting the overlap of sequentially following mat carriers is arranged between said mat carrier return means and said mat carrier feeding station.

27. Apparatus for manufacturing sections of particleboard comprising a forming conveyor, which extends between a mat carrier feeding station having a direction changing drum for turning over the mat carriers and a mat carrier transfer station and is guided beneath a stationary scattering station for scattering a mat of particulate material onto mat carriers forwarded on said forming conveyor; means for continuously driving said forming conveyor; a cut-off saw associated with said forming conveyor for separating said mat into mat sections; a transport and storage unit for supplying the mat carriers, which are each laden with a respective mat section, to a manufacturing press; and also mat carrier return means for returning the mat carriers to the mat carrier feeding station; wherein the transport and storage unit for the laden mat carriers comprises an accelerating conveyor extending between said mat carrier transfer station and said manufacturing press, said manufacturing press consisting of a discontinuously working single storey press having its own transport device which clamps onto side edges of each mat carrier after an initial infeed movement of the mat carriers; a device for separating pressed boards and mat carriers; said separating device followed by a thickness measuring device having several spaced apart measuring heads for determining the actual thickness of each manufactured board at several positions across and along each board, wherein correspondingly disposed correction positions are provided in said manufacturing press, one associated with each said measuring position, and wherein exchangeable correction insert means are provided at said correction positions for correcting the thickness of subsequent boards; and a reversible guide conveyor provided at the outlet of the press for returning the mat carriers without turning them over; and wherein means for steplessly adjusting the overlap of sequentially following mat carriers is arranged between said mat carrier return means and said mat carrier feeding station.

28. Apparatus for manufacturing particleboard mat sections comprising:
means for forming mat sections on individual mat carriers;
press means for pressing the mat sections located on the mat carriers;
means for transferring the mat section laden mat carriers into the press means;
a stationary splitting means positioned after the press means and adapted to engage between the mat carriers and the pressed mat sections and deflect the mat carriers downwardly without being turned over;
a guide conveyor positioned between the press means and the splitting means with the guide conveyor positioned beneath said splitting means for transport of said deflected mat carriers thereon without being turned over, said guide conveyor comprising an endless belt rotatable around first and second axles, the first axle positioned adjacent said press means and the second axle positioned remote from said press means, said guide conveyor being pivotable downwardly about the axis of the second axle; and
means for transferring the mat carriers from said guide conveyor to said mat section forming means turning the mat carriers over once.

29. The manufacturing apparatus of claim 28 wherein said guide conveyor is reversible.

30. The manufacturing apparatus of claim 28 wherein said splitting means includes guide means, configured to engage a lateral edge of a mat carrier, for directing said mat carriers downwardly away from the pressed mat sections.

31. The manufacturing apparatus of claim 28 wherein said splitting means includes a thin wedge having an upper surface for of support said pressed mat sections, said wedge having a V-shaped cut out portion at a leading edge thereof.

* * * * *